United States Patent
Thibblin et al.

(10) Patent No.: US 12,018,457 B2
(45) Date of Patent: Jun. 25, 2024

(54) CONSTRUCTION MACHINE WITH MEASURING SYSTEM AND CONSTRUCTION SITE MEASURING SYSTEM

(71) Applicants: LEICA GEOSYSTEMS TECHNOLOGY A/S, Odense SØ (DK); LEICA GEOSYSTEMS AG, Heerbrugg (CH); HEXAGON GEOSYSTEMS SERVICES AG, Heerbrugg (CH)

(72) Inventors: Magnus Thibblin, Odense C (DK); Tommi Juhani Kauppinen, Odense C (DK); Burkhard Böckem, Jonen AG (CH); Matthias Wieser, Wendlingen (DE); Roman Steffen, Rebstein (CH); Pascal Gohl, Zürich (CH)

(73) Assignees: LEICA GEOSYSTEMS TECHNOLOGY A/S, Odense SØ (DK); LEICA GEOSYSTEMS AG, Heerbrugg (CH); HEXAGON GEOSYSTEMS SERVICES AG, Heerbrugg (CH)

( * ) Notice: Subject to any disclaimer, the term of this patent is extended or adjusted under 35 U.S.C. 154(b) by 665 days.

(21) Appl. No.: 17/177,786

(22) Filed: Feb. 17, 2021

(65) Prior Publication Data
US 2021/0254308 A1 Aug. 19, 2021

(30) Foreign Application Priority Data
Feb. 17, 2020 (EP) .................................. 20157719

(51) Int. Cl.
*G01S 7/481* (2006.01)
*B60R 11/00* (2006.01)
(Continued)

(52) U.S. Cl.
CPC ............ *E02F 9/2087* (2013.01); *B60R 11/00* (2013.01); *E02F 9/2033* (2013.01);
(Continued)

(58) Field of Classification Search
CPC ..... E02F 9/2087; E02F 9/2033; E02F 9/2079; E02F 9/262; E02F 9/265; E02F 3/32;
(Continued)

(56) References Cited

U.S. PATENT DOCUMENTS 6,363,632 B1 * 4/2002 Stentz ..................... E02F 9/24
701/50
9,481,982 B1 * 11/2016 Pettersson ............... G01S 17/08
(Continued)

FOREIGN PATENT DOCUMENTS

| CN | 104054003 A | 9/2014 |
| CN | 106066645 A | 11/2016 |

(Continued)

OTHER PUBLICATIONS

EP Search Report in Application No. 20157719.4 dated Aug. 20, 2020.

*Primary Examiner* — Hung Q Nguyen
*Assistant Examiner* — Anthony Donald Taylor, Jr.
(74) *Attorney, Agent, or Firm* — Maschoff Brennan (57) ABSTRACT

A construction machine comprising a chassis, a steering, and a powertrain for driving the construction machine by the chassis, an earth-moving tool for working a terrain, and a measuring system having a first measuring unit configured for generating first measuring data in a first detection range and comprising at least a first camera and a first LiDAR scanner configured for rotating a first measuring beam around a first axis and around a second axis non-parallel to the first axis with a rotating speed of at least 0.5 Hz with respect to each axis, an interface connecting the first mea- (Continued)

suring unit to a computer configured for, based on the first measuring data, at least one of generating a three-dimensional model of the terrain within the first detection range, identifying an obstacle or a person within the first detection range, and controlling the steering, the powertrain, and/or the earth-moving tool.

15 Claims, 5 Drawing Sheets (51) Int. Cl.
    *E02F 9/20*     (2006.01)
    *E02F 9/26*     (2006.01)
    *G01B 21/22*     (2006.01)
    *G01S 17/89*     (2020.01)
    *G01S 17/931*     (2020.01)
    *E02F 3/32*     (2006.01)
    *E02F 3/43*     (2006.01)
    *E02F 3/76*     (2006.01)
    *E02F 3/84*     (2006.01)

(52) U.S. Cl.
CPC ............ *E02F 9/2079* (2013.01); *E02F 9/262* (2013.01); *E02F 9/265* (2013.01); *G01B 21/22* (2013.01); *G01S 7/4817* (2013.01); *G01S 17/89* (2013.01); *G01S 17/931* (2020.01); *B60R 2011/004* (2013.01); *E02F 3/32* (2013.01); *E02F 3/435* (2013.01); *E02F 3/7609* (2013.01); *E02F 3/7636* (2013.01); *E02F 3/841* (2013.01); *E02F 3/844* (2013.01); *E02F 9/205* (2013.01)

(58) Field of Classification Search
CPC ....... E02F 3/435; E02F 3/7609; E02F 3/7636; E02F 3/841; E02F 3/844; E02F 9/205; G01S 17/931; G01S 7/4817; G01S 17/89; B60R 11/00; B60R 2011/004; G01B 21/22
USPC .......................................................... 701/41
See application file for complete search history.

(56) References Cited

U.S. PATENT DOCUMENTS 9,612,331 B2    4/2017    Kwiatkowski et al.
11,225,777 B2    1/2022    Kurokami et al.

FOREIGN PATENT DOCUMENTS

| | | | | |
|---|---|---|---|---|
| CN | 208 931 253 U | | 6/2019 | |
| CN | 208931253 U | * | 6/2019 | ............ B60R 11/04 |
| CN | 110494613 A | | 11/2019 | |
| DE | 10 2016 224076 A1 | | 6/2018 | |
| DE | 102016224076 A1 | * | 6/2018 | ............. E02F 3/435 |
| DE | 102017123875 A1 | * | 2/2019 | .......... B81B 7/0067 |
| EP | 3 086 196 A1 | | 10/2016 | |
| JP | H08 160127 A | | 6/1996 | |
| JP | H08160127 A | * | 6/1996 | ............... E02F 9/24 |
| JP | 2019 167 719 A2 | | 10/2019 | |
| WO | 2019 197 064 A1 | | 10/2019 | |

* cited by examiner

CONSTRUCTION MACHINE WITH MEASURING SYSTEM AND CONSTRUCTION SITE MEASURING SYSTEM

CROSS-REFERENCE TO RELATED APPLICATIONS

This application claims priority to European Patent Application No. 20157719.4, filed on Feb. 17, 2020. The foregoing patent application is herein incorporated by reference.

FIELD OF THE INVENTION

The present invention relates to a construction machine, such as a grader, a dozer, or an excavator, having a measuring system.

BACKGROUND OF THE INVENTION

There are various measuring systems known for the specific needs in the field of construction, especially for earth-moving machines. Such measuring systems can be used with a construction machine for example to: (a) build a digital 3D model of the surroundings of the machine, (b) detect obstacles in the surroundings of the machine, and/or (c) support a control of the construction machine.

For example, EP 3 086 196 A1 suggests an environment detection by means of a camera system arranged on a bulldozer. The camera system uses a SLAM or SfM algorithm to generate a 3D point cloud of the environment.

JP 2019 167 719 A2 discloses a 2D laser scanner by means of which a 3D model of the environment is generated when an excavator, on which the 2D scanner is mounted, is pivoting.

WO 2019 197 064 A1 shows a device for monitoring a construction machine environment with a ToF camera. Images generated in such a way are used for guiding an operator of the construction machine in order to control the operation of the construction machine on the construction site according to a plan.

However, downsides of the prior art are a slow scan and/or detection of the environment of the construction machine, or, when the detection is fast, an insufficient quality of the detection for complying with high safety demands.

OBJECT OF THE INVENTION

It is therefore an object of the invention to provide a construction machine with an improved measuring system, or respectively, to provide an improved construction site measuring system. A construction machine or a construction site measuring system according to the invention allows for a quicker and more accurate detection of a surrounding of the construction machine. A particular object of the invention is to increase construction site safety. The invention can also improve an autonomous drive capability and/or an autonomous operation capability of a construction machine.

SUMMARY OF THE INVENTION

Some aspects of the invention relate to a construction machine, in particular a grader, a dozer, or an excavator, the construction machine comprising a chassis, a steering, and a powertrain for driving the construction machine by the chassis, an earth-moving tool for working a terrain, and a measuring system having a first measuring unit that is configured for generating first measuring data in a first detection range and comprising at least a first camera and a first Light Detection and Ranging (LiDAR) scanner, the first LiDAR scanner configured for rotating a first measuring beam around a first axis and around a second axis non-parallel to the first axis with a rotating speed of at least 0.5 Hz with respect to each axis, an interface connecting the first measuring unit to a computer, wherein the computer is configured for, based on the first measuring data, at least one of generating a three-dimensional model of the terrain within the first detection range, identifying an obstacle or a person within the first detection range, and controlling at least one of the steering, the powertrain, and the earth-moving tool.

In particular, the first LiDAR scanner comprises a base, a support, mounted on the base and being rotatable relative to the base, and a deflector for deflecting the first measuring beam and returning parts of the measurement beam, the deflector being mounted on the support and being rotatable relative to the support.

In one embodiment, the first LiDAR scanner is configured for continuously rotating the support relative to the base around the first axis, in particular with a rotating speed of 1 Hz, and continuously rotating the deflector relative to the support around the second axis, in particular with a rotating speed of 50 Hz.

In another embodiment, the LiDAR scanner comprises an angle encoder unit configured for determining angle data representing an orientation of the first measuring beam relative to the first and second axes.

The LiDAR scanner may comprise a cover, particularly a cover which is opaque for visible light, encasing the support and the deflector such that during a scanning movement the measurement beam passes through the cover at different penetration points.

The LiDAR scanner or the computer may comprise a data memory having stored angle-based correction parameters, wherein the computer is configured for correcting the angle data for beam offsets caused by the cover based on the correction parameters, in particular wherein the correction parameters are stored as a look up table or in the form of a correction matrix.

In particular, said cover has a hemispherical head part, which merges in a cylindrical shell connected to the base.

The computer may be configured for, based on the first measuring data, (a) generating a three-dimensional model of the terrain within the first detection range, (b) identifying an obstacle or a person within the first detection range, and (c) controlling at least one of the steering, the powertrain, and the earth-moving tool, wherein said controlling is further based on (i) an identified obstacle or person, and/or (ii) a three-dimensional model of the terrain, in particular an identified road, wherein the computer is configured for identifying roads based on the first measuring data.

In one embodiment, the construction machine comprises a target mounted on the earth-moving tool, wherein the computer is configured for tracking a pose of the target based on the first measuring data.

In other embodiments, the construction machine may comprise at least one of: (a) a GNSS-antenna configured for generating position data, (b) an Inertial Measurement Unit (IMU) configured for generating IMU data, and (c) a wireless network unit configured for transmitting data to a remote station.

The construction machine may comprise the computer. Alternatively, a remote server comprises the computer, wherein the interface comprises a wireless network unit. The wireless network unit is then configured to maintain the connection between the measuring system and the remote computer. The invention specifically also relates to a construction site system comprising a construction machine as described herein and a computer as described herein, wherein the computer can physically be comprised by the construction machine or can physically be comprised by a remote server. The invention specifically equally relates to a construction machine comprising a measuring system that comprises the computer as described herein, wherein the computer may physically be comprised by a remote server. In the latter case, the interface may also be comprised by the measuring system, as the interface is establishing and maintaining connection to the computer.

The first measuring unit may be arranged at a first location of the construction machine, wherein the measuring system further comprises a second measuring unit arranged at a second location of the construction machine, wherein the second measuring unit is configured for generating second measuring data in a second detection range and comprising at least a second camera and a second LiDAR scanner, the second LiDAR scanner configured for rotating a second measuring beam around a third axis and around a fourth axis non-parallel to the third axis with a rotating speed of at least 0.5 Hz with respect to each axis, wherein a relative position, in particular a relative pose, between the first and second measuring unit is predetermined or determinable, wherein the computer is configured for generating combined measuring data based on the first measuring data, the second measuring data, and a current relative position, in particular a current relative pose, between the first and second measuring unit.

In an embodiment, the measuring system further comprises an adapter for attaching the measuring system onto the construction machine, the first and second measuring units being arranged on respective opposing sides of the adapter, wherein a distance between the first and second measuring unit is adjustable by the adapter.

A field of view (FOV) of the first camera and a FOV of said second camera may overlap at least in part. Said first detection range and said second detection range may overlap at least in part.

Some aspects of the invention also relate to a construction site measuring system comprising a sub-system and a computer, wherein the sub-system comprises an adapter for attaching the sub-system onto a construction machine, in particular a construction machine cabin, a first measuring unit arranged at a first side of the adapter, configured for generating first measuring data, and comprising at least a first camera and a first laser based measuring device, a second measuring unit arranged at a second side of the adapter, configured for generating second measuring data, and comprising at least a second camera and a second laser based measuring device, the second side of the adapter opposing the first side of the adapter, wherein a distance between the first and second measuring unit is adjustable by the adapter, wherein the computer is configured for generating combined measuring data based on the first measuring data and the second measuring data.

The computer may be configured for generating the combined measuring data further based on a current distance between the first and second measuring unit.

The adapter may be selected from a plurality of differently dimensioned adapters such that the first and second measuring units protrude beyond a respective edge of the construction machine cabin, in particular wherein the adapter and the first and second measuring units form a plug-in system.

The adapter may have a dimension adjustment mechanism, in particular a telescopic mechanism.

The adapter may comprise a third camera configured for generating third measuring data, and wherein generating the combined measuring data is further based on the third measuring data, in particular wherein the adapter comprises a fourth camera configured for generating fourth measuring data, and wherein generating the combined measuring data is further based on the fourth measuring data.

At least one of the first measuring unit, the second measuring unit, and the adapter may comprise a GNSS-antenna configured for generating fifth measuring data, and wherein generating the combined measuring data is further based on the fifth measuring data.

At least one of the first measuring unit, the second measuring unit, and the adapter may comprise an Inertial Measurement Unit (IMU) configured for generating sixth measuring data, and wherein generating the combined measuring data is further based on the sixth measuring data.

At least one of the first measuring unit, the second measuring unit, and the adapter may comprise a cellular unit configured for transmitting measuring data to a remote station, in particular at least one of the first measuring data, the second measuring data, the combined measuring data, the third measuring data, the fourth measuring data, the fifth measuring data, and the sixth measuring data, in particular wherein the remote station is the computer.

The adapter may comprise a Head Up Display (HUD) arranged in a way to be visible for a person in the construction machine cabin and configured for providing visual information based on measuring data, in particular based on at least one of the first measuring data, the second measuring data, the combined measuring data, the third measuring data, the fourth measuring data, the fifth measuring data, and the sixth measuring data.

At least one of a field of view (FOV) of the first camera and a FOV of the second camera may overlap at least in part, a FOV of the first camera and a FOV of the third camera may overlap at least in part, a FOV of the second camera and a FOV of the third camera may overlap at least in part, a FOV of the first camera and a FOV of the fourth camera may overlap at least in part, and a FOV of the second camera and a FOV of the fourth camera may overlap at least in part.

At least one of the first measuring unit, the second measuring unit, and the adapter may comprise the computer.

Further provided is a construction site measuring system for a construction machine, the construction site measuring system comprising a first measuring unit configured for generating first measuring data in a first detection range and comprising at least a first camera and a first LiDAR scanner, a second measuring unit spaced apart from the first measuring unit, configured for generating second measuring data in a second detection range, and comprising at least a third camera and a second LiDAR scanner, the first detection range and the second detection range overlapping at least in part, each LiDAR scanner configured for rotating a measuring beam around a first axis and around a second axis non-parallel to the first axis with a rotating speed of at least 0.5 Hz with respect to each axis, a computer configured for generating combined measuring data based on the first measuring data and the second measuring data.

The first axis may be perpendicular to the second axis.

The computer may be configured for tracking a pose of a target mounted on a tool of the construction machine by evaluating at least one of the first measuring data, the second measuring data, and the combined measuring data.

At least one of the first measuring unit and the second measuring unit may comprise at least one of: a GNSS-antenna configured for generating fifth measuring data, an Inertial Measurement Unit (IMU) configured for generating sixth measuring data, a cellular unit configured for transmitting measuring data to a remote station, and the computer.

BRIEF DESCRIPTION OF THE DRAWINGS

By way of example only, preferred embodiments of the invention will be described more fully hereinafter with reference to the accompanying figures, wherein.

DETAILED DESCRIPTION

Figure 1:
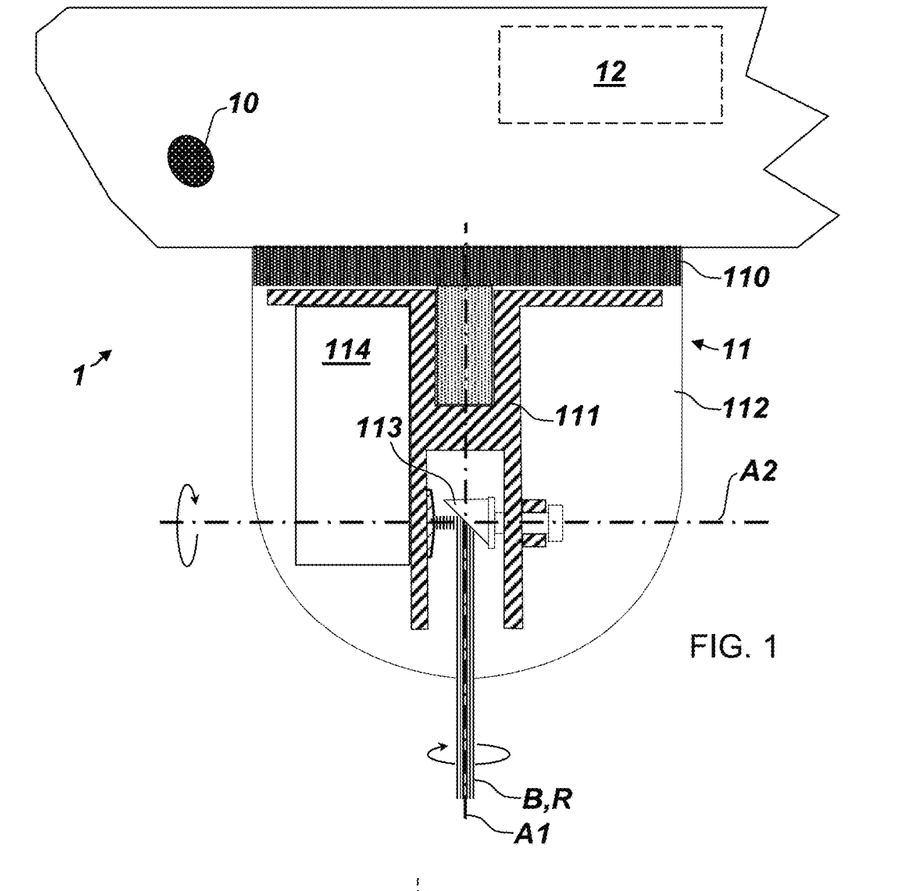
FIG. 1 shows a schematic view of an embodiment of a measuring unit according to the invention, comprising a LiDAR scanner and a camera.

FIG. 1 shows a schematic overview of one embodiment of a measuring unit comprised by a measuring system according to this invention. The measuring unit 1 comprises a first camera 10 and a first LiDAR scanner 11 configured for rotating a first measuring beam B around a first axis A1 and around a second axis A2. In a preferred embodiment, the axes A1 and A2 are perpendicular and are crossing in the impinging point of the measuring beam B on the deflector.

The LiDAR scanner 11 is configured to rotate the beam B around both axes with a rotating speed of at least 0.5 Hz in each case. What follows is a scanning pattern that captures a full range of the LiDAR scanner 11 (which is shown in detail in FIG. 2) in a very short time. Said range R of the first LiDAR scanner 11 and a field of view (FOV) of the first camera 10 together form a first detection range of the measuring unit 1, where first measuring data are generated. In particular, the measuring data comprise angle data with respect to the two rotation axes A1 and A2, distance data generated with the measuring beam, specifically based on the time of flight, and image data from the first camera.

The first measuring unit 1 also comprises an interface 12 connecting the first measuring unit to a computer which is configured for, based on the first measuring data, at least one of (a) generating a three-dimensional model of the worked terrain, and (b) identifying an obstacle or a person within the first detection range. The computer can be built into the first measuring unit, for example together with the interface 12, or the computer can be located inside the construction machine. In another embodiment, the computer can be a remote server, wherein the interface is configured to connect to the remote server for example over WiFi, Bluetooth, or other mobile networks.

Specifically, the LiDAR scanner 11 has a base 110, a support 111 rotatably mounted on the base. To protect the moving components, the LiDAR scanner particularly has a cover 112. A deflector 113 for deflecting the first measuring beam B and returning parts R of the measurement beam is rotatably arranged on the support 111. The box 114 may comprise a transmitter for sending out the measuring beam B and a receiver for detecting its reflexion R (this is shown in the example of FIG. 4). In other embodiments, the box 114 can only comprise the receiver, as will be exemplarily shown with FIG. 3.

Figure 2:
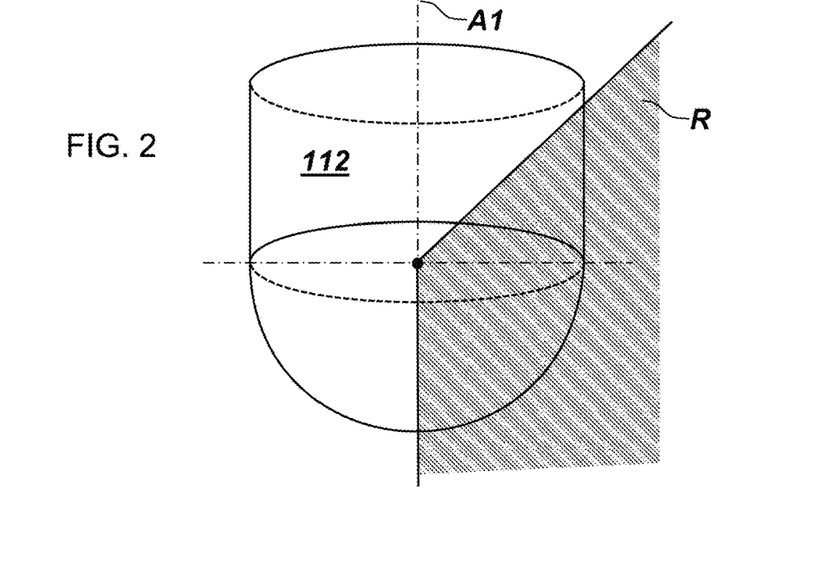
FIG. 2 shows a schematic view of a range of the LiDAR scanner comprised by the measuring unit.

FIG. 2 shows, in a schematic perspective view, the LiDAR scanner range R within which LiDAR data (angle data and distance data, or both combined as 3D coordinate data) are recordable. The shown shaded plane is to be projected by a 360° turn around the axis A1 to represent the actual three-dimensional LiDAR range. What is further shows here is the general outer shape of the LiDAR scanner 11. The cover 112 has a hemispherical lower part, which merges in a cylindrical shell connected to the base. The cover 112 is particularly opaque for visible light, i.e. only light within a specific wavelength range can pass through. The first measuring beam B and return beam R have a wavelength within this wavelength range. The cover 112 encases the support 111 and the deflector such that during a scanning movement the measurement beam passes through the cover at different penetration points.

Figure 3:
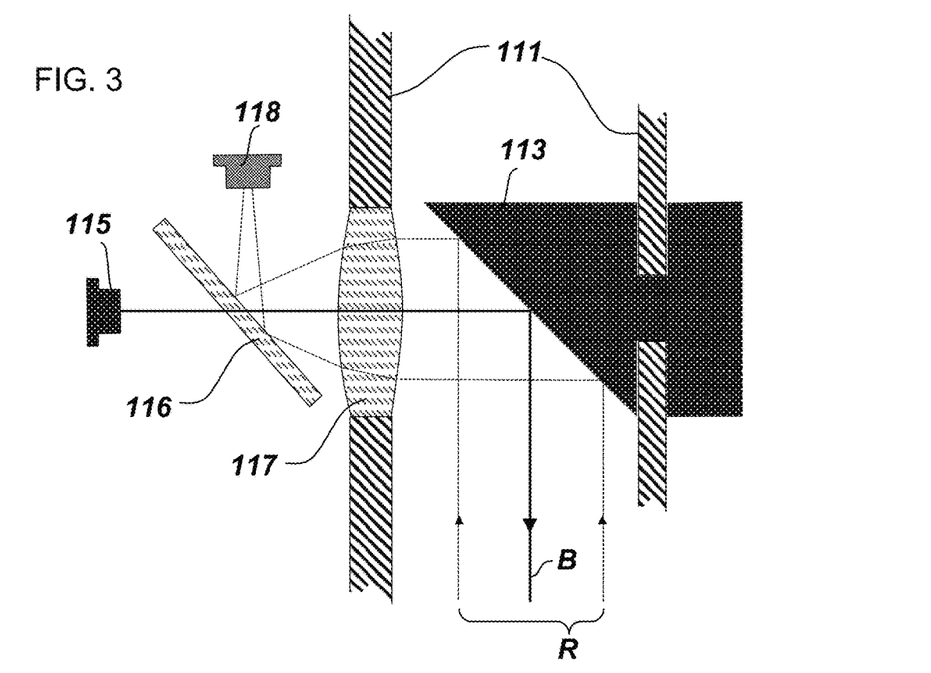
FIGS. 3 and 4 show two examples of a configuration of a LiDAR scanner according to the invention.
Figure 4:
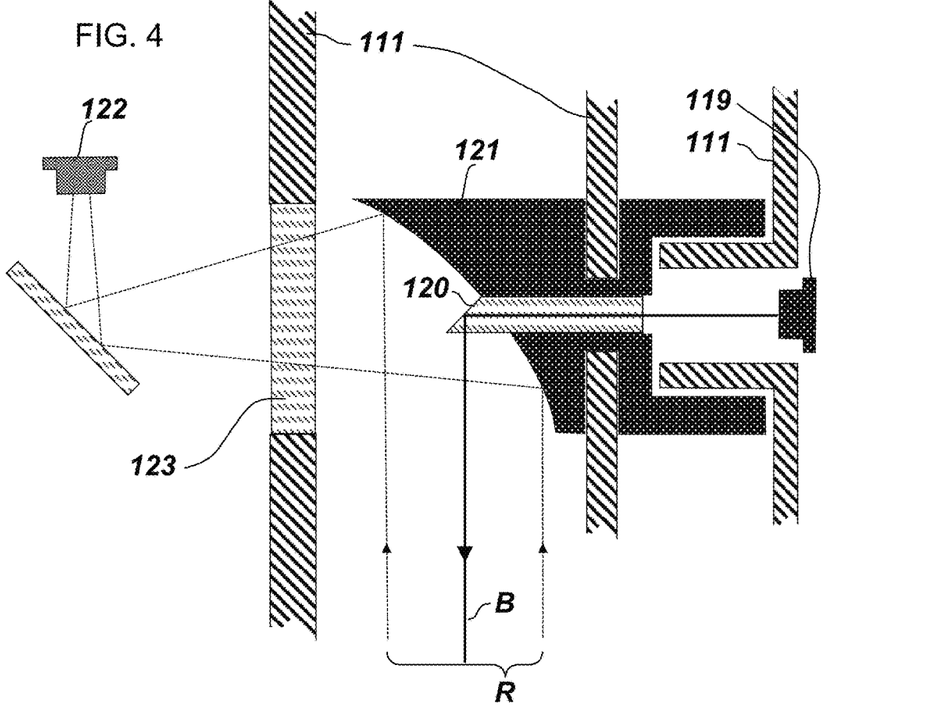

FIGS. 3 and 4 each show an exemplary embodiment of the deflection of the measuring beam. In particular, the measuring beam consists of high-frequency pulses of light which are detected when their reflections return to the scanner in order to determine a distance value based on the speed of light and a measured time between sending out the respective pulse and receiving its reflection pulse.

FIG. 3 shows a deflector 113 with a planar surface. A transmitter 115 is sending the measuring beam B through the optical elements 116 and 117 onto the deflector 113 which deflects the beam outside the scanner towards the environment to be scanned. A reflection R of the beam is captured by the deflector 113 and deflected back into the scanner. The optical element 117 focusses the return beam R and the optical element 116 deflects the focused return beam R onto the receiver 118. The optical element 116, in particular a mirror plate, can be semi-translucent such that the transmission beam B can pass through and the return beam R is reflected. However, the optical element 116 can also have a small hole to let the beam B through whereas the wider beam R will be for the most part deflected.

FIG. 4 shows a transmitter 119 for providing the measuring beam B, which is sent through optical elements 120 inside the deflector 121 deflecting the beam B out of the scanner. The transmitter 119 is arranged in the support 111, but the optical element 120 is rotating together with the deflector 121. The deflector 121 is, in the shown example, a parabolic mirror not only deflecting the return beam R towards the receiver 122, but also focusing it. As shown here, the return beam R can be deflected again within the support 111 or within the box 114 for maintaining a compact construction. An optical element 123 may be provided for protecting the inside of the box 114 and/or for avoiding unwanted reflections to reach the sensor 122.

The support 111 is particularly configured to continuously rotate with a speed of about 1 Hz around the axis A1, whereas the deflector is configured to rotate constantly with a speed of about 50 Hz around the axis A2. For both axes, an angle encoder may be provided, both of said angle encoders comprised by an angle encoder unit. The encoder for the axis A1 can for example be provided in the base 110 or in the support 111. The encoder for the axis A2 can for example be provided in the support 111 or in the deflector 113/121. The respective encoders are configured for determining an orientation of the measuring beam relative to the first and second axes A1, A2 represented by angle data. In particular, the angle data of the measuring beam comprise a polar angle and an azimuthal angle. Together with a distance value determined based on the transmission and reception of the beam, these three values form spherical coordinates, a plurality of which may form a three-dimensional point cloud. A combination of the angle data and the distance values, or the 3D point cloud, may form the LiDAR data which are collected with the LiDAR scanner. The 3D point cloud may be considered a processed combination of the angle data and distance values.

The LiDAR scanner may further comprise a data memory, e.g. in the box 12 or somewhere else in the scanner or in the construction machine, the data memory having stored angle-based correction parameters, wherein the computer may correct the angle data based on the correction parameters. The reason a correction might be appreciated is that the beam can be exposed to offsets caused by the cover 112.

Figure 5:
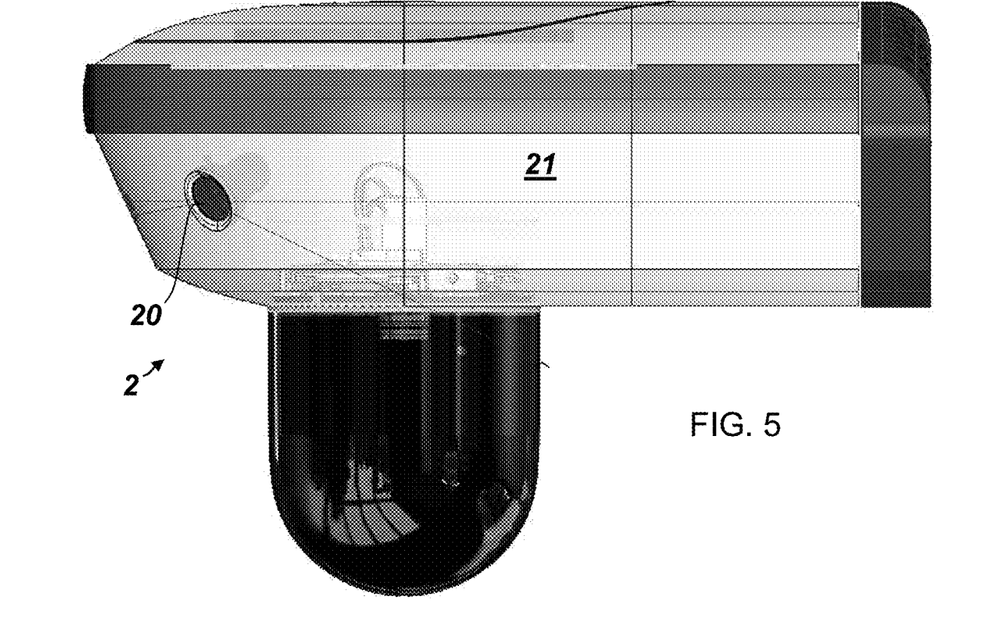
FIGS. 5 and 6 show an embodiment of a measuring unit of a construction machine according to the invention.

FIG. 5 shows an embodiment of the measuring unit. This device is referred to herein often as "first" measuring unit because, as will be shown with FIGS. 7-11, there can also be subsequent measuring units, which are in particular cooperating. Any subsequent measuring unit may be configured as described herein. A single measuring unit as shown in FIG. 5 is mounted onto a cabin of a construction machine 3 in FIG. 6, which is an excavator. The measuring unit 2 has a first camera 20 and a second camera which is obstructed in FIG. 5 because it is arranged on the back side of the housing 21. As usual for construction machines, the excavator has a chassis 31 and a powertrain 32.

In general, a measuring unit according to the invention may in embodiments comprise at least one of: (a) a GNSS-antenna configured for generating position data, (b) an Inertial Measurement Unit (IMU) configured for generating IMU data, and (c) a cellular unit configured for transmitting any data to a remote station, all of which is comprised in this example 2 in FIGS. 5 and 6 in the housing 21, where also the computer and the interface is located.

The computer can use the measuring data generated by the measuring unit, which specifically are LiDAR data from the LiDAR scanner and image data from the cameras, for (a) generating a 3D model, in particular of the worked terrain, and/or (b) obstacle detection.

Generally, the image data can be used for colorizing the LiDAR data and/or for optimizing a referencing of the LiDAR data by matching them with an image-based generated point cloud (e.g. generated by a visual simultaneous localization and mapping (VSLAM) algorithm). Also a feature tracking/feature recognition algorithm can help combining the LiDAR data to a consistent and well-referenced global point cloud. Similarly, the position data gained with the GNSS-antenna and the IMU data from the IMU can be used for a sensor fusion to obtain a higher precision when building a 3D model of the terrain. A VSLAM point cloud generation can also be supported on LiDAR data, in particular in such a way that the LiDAR data introduce scale and thereby increase stability of the algorithm.

Furthermore, because the LiDAR scanner is capable of capturing a three-dimensional representation of the surrounding at a very fast pace, it is possible, with a moving construction machine, to build up a coherent 3D point cloud based on a LiDAR SLAM algorithm that uses only the LiDAR data or the LiDAR data in combination with image data from the camera(s). In any such ways SLAM is used, such localization and mapping is specifically advantageous when for example the construction machine is operating under a bridge or some other place shadowed from GNSS signals. Any such SLAM algorithm, whether it is visual based or LiDAR based, is in particular embodiments supported by at least one IMU delivering IMU data that are also processed to stabilize the algorithm. In particular, all such fused sensor data can be processed by a Kalman filter.

Figure 7:
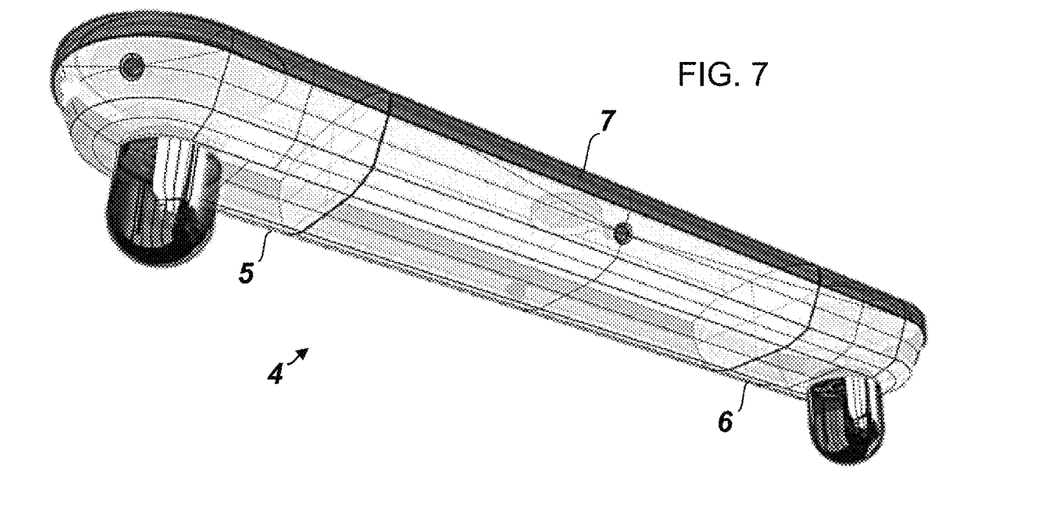
FIG. 7 shows a further embodiment of a measuring unit of a construction machine according to the invention.

FIG. 7 shows a measuring system 4 comprising a first measuring unit 5, a second measuring unit 6, and an adapter 7 for attaching the measuring system onto a construction machine. Different use cases for this modular system are shown in the FIGS. 8-11. The first and second measuring units are arranged on respective sides of the adapter 7, wherein the distance between the first and second measuring unit is adjustable by the adapter.

However, also without such an adapter, the first measuring unit can be arranged at a first lateral side of the construction machine, e.g. on top or on the front face of the cabin, wherein the second measuring unit is then arranged at a second lateral side of the construction machine, the second lateral side opposing the first lateral side. A distance between the first and second measuring unit is predetermined or determinable, wherein the computer is configured for generating combined measuring data based on the first measuring data from the first measuring unit, the second measuring data collected with the second measuring unit, and a current distance between the first and second measuring unit. In such a case, where no adapter connecting the two measuring units is used, also the relative orientation between the two measuring units will preferably be taken into account.

In any case, the computer can combine the first measuring data and the second measuring date (and optionally any further measuring data, in particular and any further image data that might be available from additional cameras) to form combined measuring data, and use these combined measuring data for (a) generating a 3D model and/or (b) obstacle detection. Each LiDAR scanner is particularly configured for generating the LiDAR data while the two rotation axes A1 and A2 rotate faster than 0.1 Hz, particularly faster than 1 Hz, with a point acquisition rate of at least 300,000 points per second, particularly at least 500,000 points per second.

The adapter 7 may be selected from a plurality of differently dimensioned adapters such that the system fits different kinds of construction machines. The first and second measuring units may specifically be aligned with, or protrude beyond, a respective edge of a construction machine cabin in each case. The adapter and the first and second measuring units conclusively form a plug-in system which is highly customizable, as the adapter and/or the measuring units can also be chosen from differently equipped types.

For example, the adapter can have a dimension adjustment mechanism, in particular a telescopic mechanism. The adapter may further comprise one or more further cameras adding to the measuring system. Also, the adapter may comprise a GNSS-antenna, an IMU, and/or a cellular module for data communication.

Figure 6:
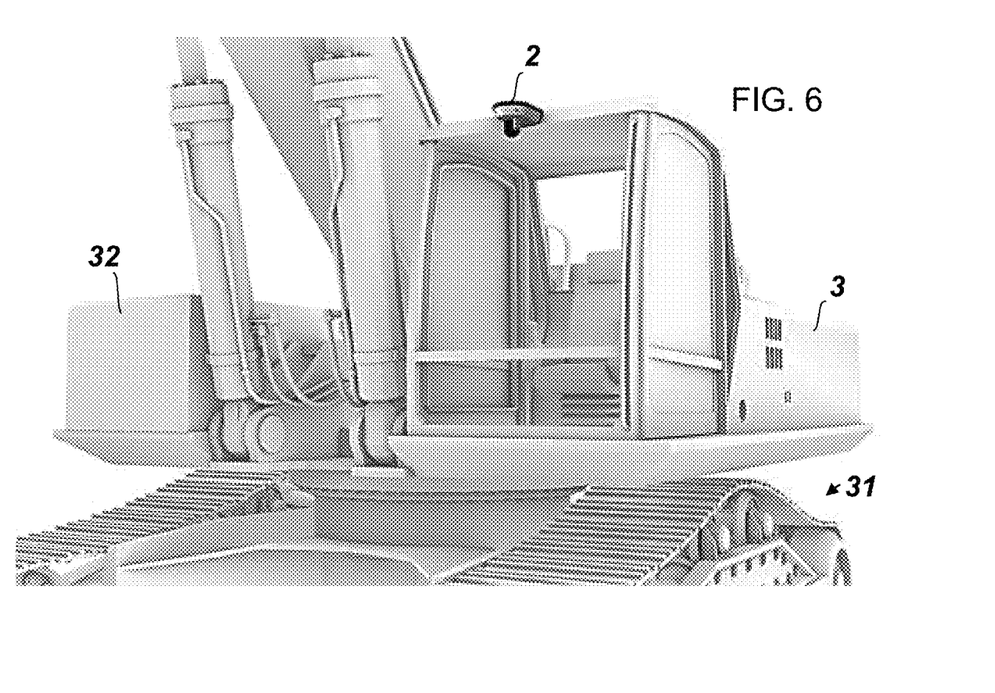
Figure 8:
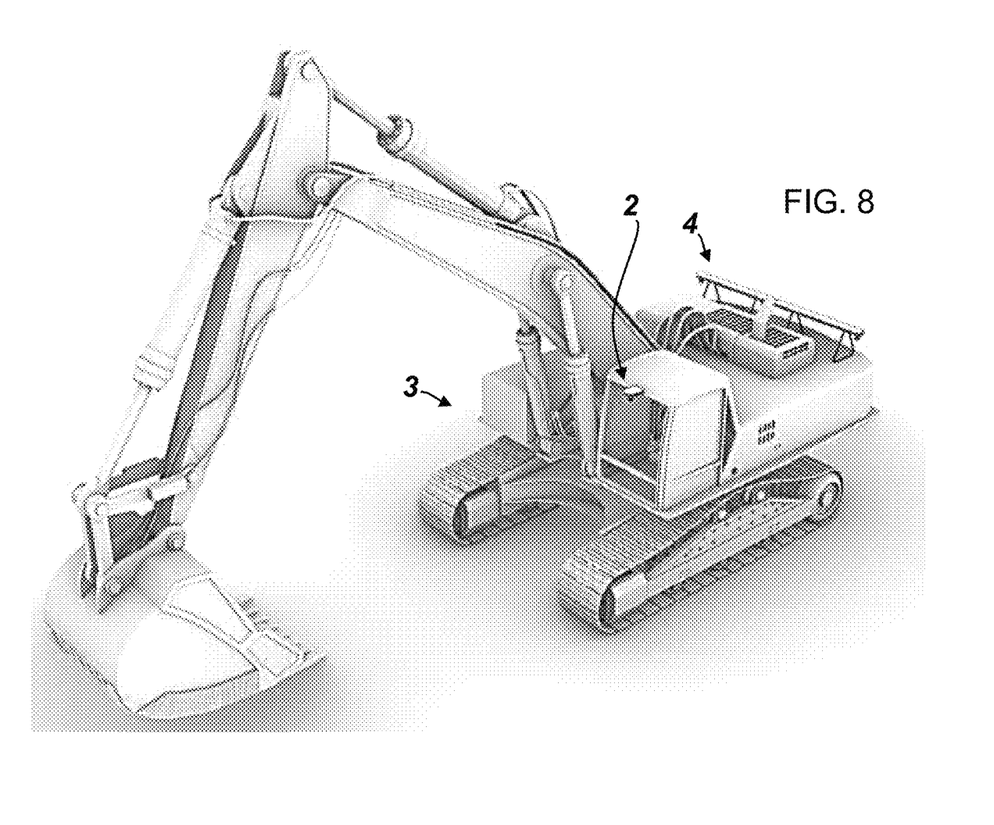
FIG. 8 shows another embodiment of a measuring unit of a construction machine according to the invention, comprising a combination of the embodiment of FIG. 5 and the embodiment of FIG. 7.

FIG. 8 shows an example of the system 4 from FIG. 7 being mounted on the excavator 3 known from FIG. 6, wherein the system 4 is combined with the single measuring unit 2 in that they may contribute to building the same 3D point cloud of the terrain, or in that they track obstacles or persons or animals entering a danger zone around the machine.

Figure 9:
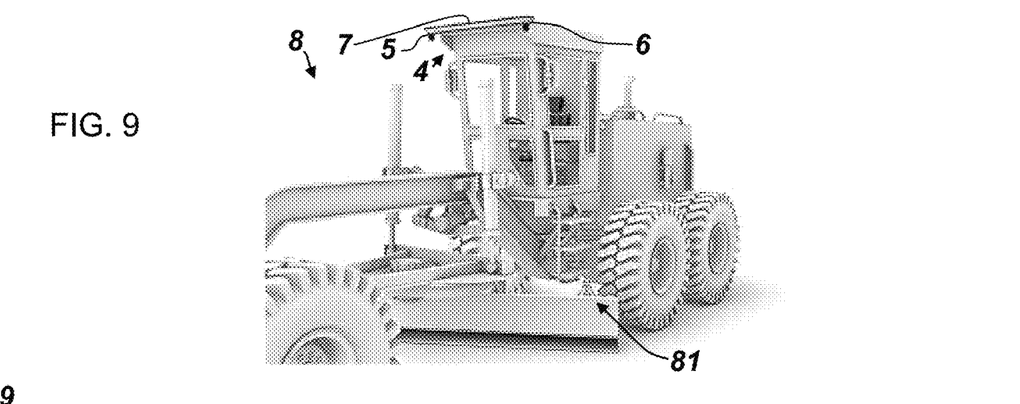
FIGS. 9 and 10 show two exemplary embodiments of a measuring unit of a construction machine according to the invention, each configured to track a pose of a target mounted to an earth-moving tool of the construction machine.
Figure 10:
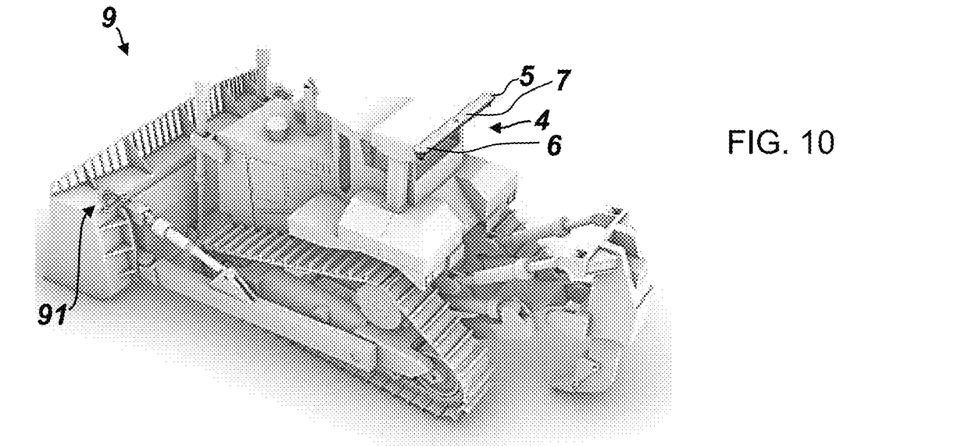

FIGS. 9 and 10 show a grader 8 and a dozer 9, wherein at least one target 81/91 is mounted on the respective earth-moving tool. The computer is in this embodiment configured for tracking a pose of a target. The target(s) can be tracked by at least the cameras comprised by the first and/or second measuring units 5/6 of the measuring system 4. Alternatively or additionally, the LiDAR scanners can also keep track of the pose of the target(s). By continuously determining the current pose of the target(s), a current position and/or orientation of the earth-moving tool can be derived, because the targets have a predetermined referenced location and alignment on the tool.

Such a target may be a three-dimensional camera target, as shown in the FIGS. 9 and 10, where the targets comprise a plurality of spherical elements each provided with a coded pattern that can be recognized on the image data. For example, such patterns are QR codes wherein the computer can determine a current pose of the target by the way the cameras perceive a respective distortion of the code. However, such target may be embodied differently. For example, a target can be two-dimensional in the form of a plate that has a checkered pattern on it.

Generally, a field of view (FOV) of a camera of a first measuring unit and a FOV of a camera of a second measuring unit overlap at least in part. In consequence, the first detection range and the second detection range overlap at least in part, because LiDAR ranges of the LiDAR scanners of the first and second measuring units also overlap. With respect to a single measuring unit, or in other words: with respect to a measuring unit alone, in case it comprises more than one camera, these cameras also preferably have overlapping FOVs. In case of an adapter 7 of a measuring system 4 also having a camera, such camera also has an overlapping FOV with the other cameras available.

Figure 11:
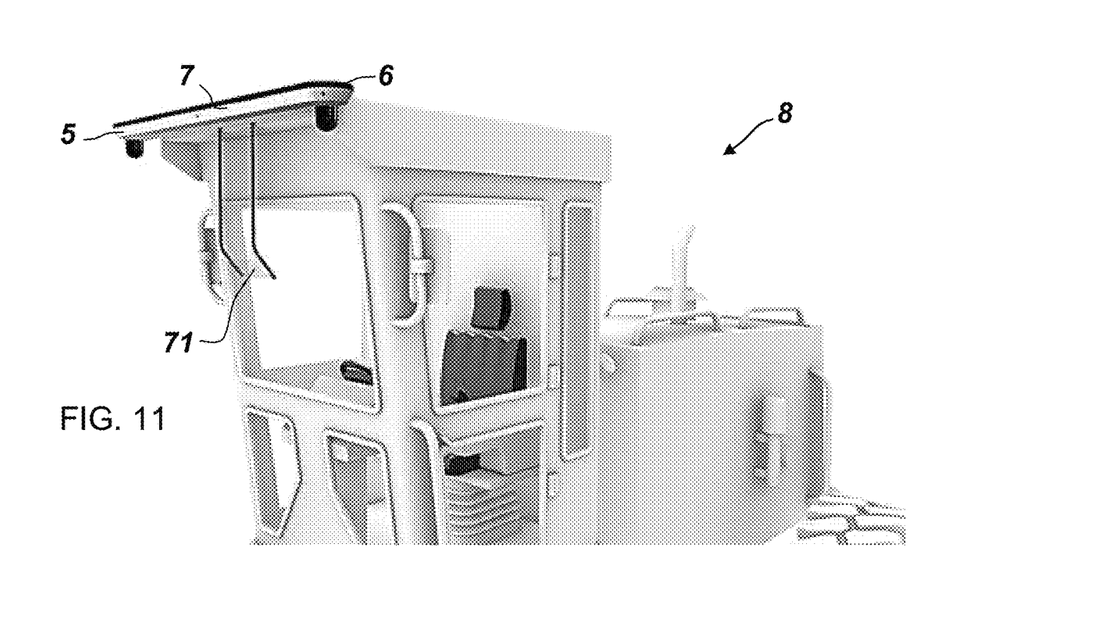
FIG. 11 shows yet another embodiment of a measuring unit of a construction machine according to the invention, wherein an HUD is provided that informs an operator of the construction machine about safety-relevant and/or productivity-relevant visualisations.

In a further embodiment, as can be seen in FIG. 11, the adapter may comprise a Head Up Display (HUD) 71 arranged in a way to be visible for a person in the construction machine cabin and configured for providing visual information based on any measuring data, in particular based on at least one of the first measuring data from the first measuring unit 5, the second measuring data from the second measuring unit 6, the combined measuring data, or image data from any camera or a combination of image data from a plurality of cameras. In particular, the operator of the grader 8 can be warned with the HUD 71 of any obstacle or emerging danger detected with a measuring unit or measuring system according to the invention. The HUD can of course be combined with any other embodiment as presented herein.

The general purpose of the measuring unit or measuring system according to the invention can be various. A three-dimensional model of the terrain can be generated for example to document the as-built condition of the worked terrain, but also for example to capture the condition of the terrain before being worked. Additionally or alternatively, the measuring data can be used to identify an obstacle or a person as a safety measure. The measuring unit(s) or measuring system can be connected to an alarm system that warns at least one of the operator of the construction machine and persons outside the construction machine, e.g. via loudspeakers or flash light. Again, additionally or alternatively, the measuring data can be used for controlling at least one of the steering, the powertrain, and the earth-moving tool in order to provide (at least partly) autonomous driving capability of the construction machine. In particular embodiments, such machine control can automatically get out of the way of obstacles in that e.g. the steering is controlled or interfered when it is currently manual. The computer can also be configured for recognizing objects, in particular roads, e.g. by feature recognition algorithms that are applied to the image data collected with the camera(s) and/or to the 3D point cloud generated at least with the LiDAR data from the LiDAR scanner(s). In this case, the machine control can also rely on such object recognition such that an autonomous drive is at least in part based on e.g. detected roads that may be driven.

Although the invention is illustrated above, partly with reference to some preferred embodiments, it must be understood that numerous modifications and combinations of different features of the embodiments can be made. All of these modifications lie within the scope of the appended claims.

What is claimed is:

1. A construction machine comprising:
    a chassis, a steering, and a powertrain for driving the construction machine by the chassis,
    an earth-moving tool for working a terrain; and
    a measuring system, including:
        a first measuring unit configured for generating first measuring data in a first detection range and comprising at least a first camera and a first Light Detection and Ranging (LiDAR) scanner,
    wherein the first LiDAR scanner comprises:
    a base,
    a support mounted on the base and being rotatable relative to the base, and
    a deflector for deflecting a first measuring beam sent from the first LiDAR scanner towards the terrain and returning parts of the first measuring beam to the first LiDAR scanner, the deflector being mounted on the support and being rotatable relative to the support,
    wherein the first LiDAR scanner is configured for rotating the first measuring beam around a first axis by continuously rotating the support relative to the base around the first axis, and around a second axis non-parallel to the first axis by continuously rotating the deflector relative to the support around the second axis, with a rotating speed of at least 0.5 Hz with respect to each axis,
    an interface connecting the first measuring unit to a computer, wherein the computer is configured for, based on the first measuring data, at least one of:
        generating a three-dimensional model of the terrain within the first detection range,
        identifying an obstacle or a person within the first detection range, and
        controlling at least one of the steering, the powertrain, and the earth-moving tool.

2. The construction machine according to claim 1, wherein the first LiDAR scanner is configured for
    continuously rotating the support relative to the base around the first axis with a rotating speed of 1 Hz, and
    continuously rotating the deflector relative to the support around the second axis with a rotating speed of 50 Hz.

3. The construction machine according to claim 1, wherein the LiDAR scanner comprises an angle encoder unit configured for determining angle data representing an orientation of the first measuring beam relative to the first and second axes.

4. The construction machine according to claim 1, the LiDAR scanner comprises a cover encasing the support and the deflector such that during a scanning movement, the first measuring beam passes through the cover at different penetration points.

5. The construction machine according to claim 4, wherein the LiDAR scanner or the computer comprises a data memory having stored angle-based correction parameters, wherein the computer is configured for correcting angle data for beam offsets caused by the cover based on the correction parameters.

6. The construction machine according to claim 4, wherein the cover has a hemispherical head part that merges into a cylindrical shell connected to the base.

7. The construction machine according to claim 1, wherein the computer is configured for, based on the first measuring data,
- generating the three-dimensional model of the terrain within the first detection range,
- identifying the obstacle or the person within the first detection range, and
- controlling at least one of the steering, the powertrain, and the earth-moving tool, wherein said controlling is further based on at least one of:
  - the identified obstacle or person, and
  - the generated three-dimensional model of the terrain, the generated three-dimensional model of the terrain comprising at least one identified road, wherein the computer is configured for identifying a plurality of roads based on the first measuring data.

8. The construction machine according to claim 1, comprising a target mounted on the earth-moving tool, wherein the computer is configured for tracking a pose of the target based on the first measuring data.

9. The construction machine according to claim 1, comprising at least one of:
- a Global Navigation Satellite System (GNSS) antenna configured for generating position data,
- an Inertial Measurement Unit (IMU) configured for generating IMU data, and
- a wireless network unit configured for transmitting data to a remote station.

10. The construction machine according to claim 1, wherein the computer is built into the first measuring unit.

11. The construction machine according to claim 1, wherein a remote server comprises the computer and wherein the interface comprises a wireless network unit.

12. The construction machine according to claim 1, wherein the first measuring unit is arranged at a first location of the construction machine, and wherein the measuring system further comprises:
- a second measuring unit arranged at a second location of the construction machine, wherein the second measuring unit is configured for generating second measuring data in a second detection range and comprising at least a second camera and a second LiDAR scanner, the second LiDAR scanner configured for rotating a second measuring beam around a third axis and around a fourth axis non-parallel to the third axis, with a rotating speed of at least 0.5 Hz with respect to each axis,
- wherein a current relative position between the first measuring unit and the second measuring unit is predetermined or determinable, and
- wherein the computer is configured for generating combined measuring data based on the first measuring data, the second measuring data, and the current relative position between the first measuring unit and the second measuring unit.

13. The construction machine according to claim 12, wherein the measuring system further comprises an adapter for attaching the measuring system onto the construction machine, the first and second measuring units being arranged on respective opposing sides of the adapter, such that a distance between the first measuring unit and the second measuring unit is adjustable by at least one dimension adjustment mechanism of the adapter.

14. A construction site measuring system comprising a sub-system and a computer, wherein the sub-system comprises:
- an adapter for attaching the sub-system onto a construction machine;
- a first measuring unit arranged at a first side of the adapter, the first measuring unit configured for generating first measuring data in a first detection range, and comprising at least a first camera and a first LiDAR scanner, the first measuring data comprising LiDAR data from the first LiDAR scanner and image data from the first camera; and
- a second measuring unit arranged at a second side of the adapter, the second measuring unit configured for generating second measuring data in a second detection range, and comprising at least a second camera and a second LiDAR scanner, the second measuring data comprising LiDAR data from the second LiDAR scanner and image data from the second camera,
- wherein the computer is configured to generate combined measuring data based on the first measuring data and the second measuring data,
- wherein each LiDAR scanner comprises a base, a support mounted on the base and being rotatable relative to the base, and a deflector for deflecting a respective measuring beam sent from the respective LiDAR scanner towards a terrain and returning parts of the respective measuring beam to the respective LiDAR scanner, the deflector being mounted on the support and being rotatable relative the support,
- wherein each LiDAR scanner is configured to rotate the respective measuring beam around a respective first axis with a first rotating speed of at least 0.5 Hz by continuously rotating the support relative to the base around the respective first axis, and around a respective second axis non-parallel to the respective first axis with a second rotating speed of at least 0.5 Hz by rotating the deflector relative to the support around the respective second axis, and
- wherein the second side of the adapter is opposing the first side of the adapter, such that a distance between the first measuring unit and second measuring unit is adjustable by at least one dimension adjustment mechanism of the adapter.

15. The construction machine according to claim 1, wherein the computer is located inside the construction machine.

* * * * *